2 Sheets—Sheet 1.
J. FORTENBACH.
DIES FOR MAKING WATCH-CASE BACKS.
No. 185,172. Patented Dec. 12, 1876.
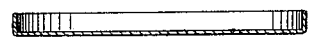
Fig. 1
Fig. 6
Fig. 5
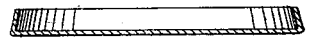
Fig. 4
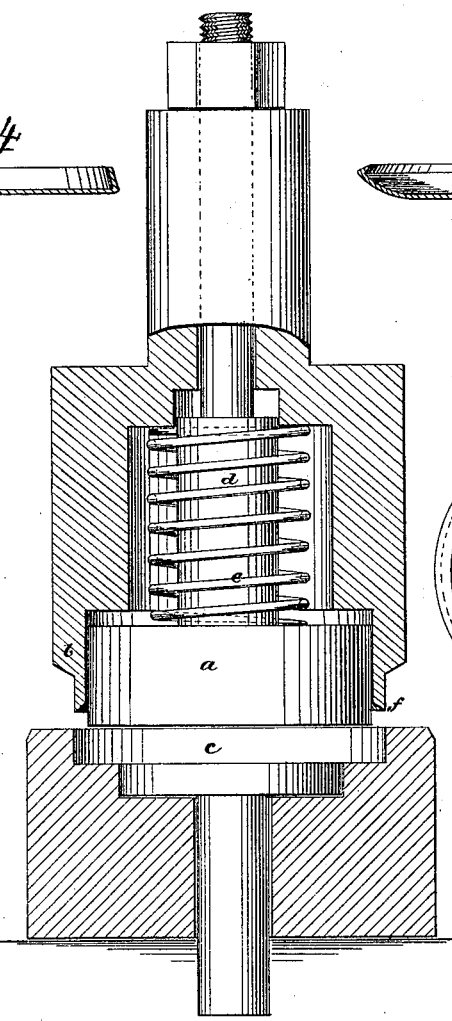
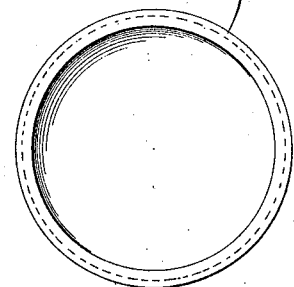
Fig. 9
Fig. 10
Witnesses:
James H. Hunter
K. Newell
Inventor:
Joseph Fortenbach

J. FORTENBACH.
DIES FOR MAKING WATCH-CASE BACKS.

No. 185,172. Patented Dec. 12, 1876.

Witnesses:
K. Newell
James H. Hunter

Inventor
Joseph Fortenbach

UNITED STATES PATENT OFFICE.

JOSEPH FORTENBACH, OF CARLSTADT, NEW JERSEY.

IMPROVEMENT IN DIES FOR MAKING WATCH-CASE BACKS.

Specification forming part of Letters Patent No. 185,172, dated December 12, 1876; application filed May 7, 1875.

*To all whom it may concern:*

Be it known that I, JOSEPH FORTENBACH, of Carlstadt, Bergen county, in the State of New Jersey, have invented certain new and useful Improvements in the Manufacture of the Backs and Caps of Watch-Cases, of which the following is a full, clear, and exact description, reference being had to the drawings, forming a part of this specification.

Watch-cases have heretofore been made in the following manner: The metal was first cast into bars. Bezels and centers were then drawn from the bars by a draw-bench, through a draw-plate or dies, then cut off in suitable length, soldered and swaged down to a suitable shape and size.

For the backs and caps plates were rolled out through rollers to the required thickness, cut in shape with shears, and swaged up by followers, made usually of brass or composition. Snaps were then soldered on, and the pieces finished up in lathes, and the required form given to them by means of gravers and different other and well-known tools.

By my improvements I am enabled to manufacture a watch-case without the necessity of first drawing any of the parts from bars, and then soldering the ends of the sections cut therefrom, or of making the snaps separate from such parts, and subsequently uniting them by means of solder.

By such improvements all the parts referred to are formed up by means of a series of dies, the centers containing shoulders for bezels and caps, back and front backs, the bezels to their proper shape, and the covers containing snaps formed solidly thereto, thereby avoiding the necessity of solder and much manual labor in the attachment of such snaps.

Figure 2:
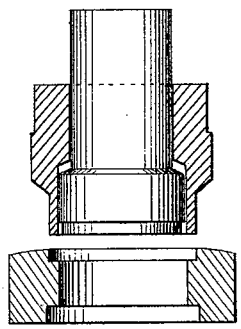
Figure 3:
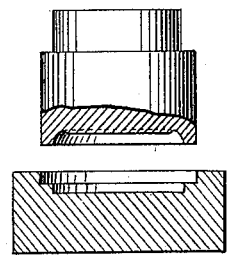

To make backs and caps, which is the subject-matter of the present application, without soldering on the snap, or the aid of hand-labor after the use of the dies in the forming up of a snap, a cup-shape piece, as shown in Figure 1, is first obtained in a double-action press with dies, which are shown in Fig. 2. Then, by other dies, which are shown in Fig. 3, the edge of the piece is crowded in a little, as seen in Fig. 4. The piece is then operated upon by a double upper and a lower die, which dies are shown in Fig. 5. The inside of the double upper die prevents the metal from lapping over while the outside one is crowding down the metal into an angular shape for the snap part of the back or cap. The result is, the piece as shown in Fig. 6.

Figure 7:
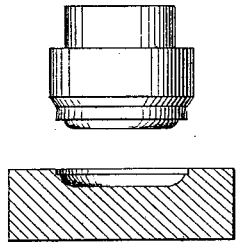
Figure 8:
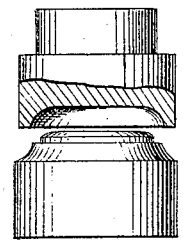

The operation of the dies $a$, $b$, and $c$ is as follows: The piece, as shown in Fig. 4, is placed under the upper double die. The inner die $a$ is connected to the outer one $b$ by means of a stout spring, $e$, passing up the shank $d$. This spring elevates the outer die from the lower face of the inner one. A downward pressure of the outer die will carry its angular edge $f$ down on the flange of the cup-piece, Fig. 4, carrying the metal to the inside, and giving it the same shape as the angular cavity. On releasing the exterior die it returns to its position above the inner die, ready for a second operation. The piece is then placed in a single-action press between dies, which are shown in Fig. 7, which prepares it for other dies, which are shown in Fig. 8, by reason of which it gets the shape shown, respectively, in Figs. 9 and 10. It is then ready to be finished up in the usual way. Hence, it is seen that, by the aid of these last-mentioned dies, the solid angular portion of the snap is obtained without the necessity of soldering on an angular piece, or forming up of a snap with hand-tools, as formerly practiced—a result never before accomplished prior to my invention of such dies.

I claim—

1. The method of forming up watch-case caps and backs by means of the dies, substantially as described.

2. The combination of the dies shown in Figs. 2, 3, 5, 7, and 8.

3. The dies $a$, $b$, and $c$, the upper one being double, and containing an angular edge, $f$, substantially as and for the purpose described.

JOSEPH FORTENBACH.

Witnesses:
 JAMES H. HUNTER,
 K. NEWELL.